United States Patent
Lee (10) Patent No.: US 12,533,139 B2
(45) Date of Patent: Jan. 27, 2026

(54) FRAME COMPONENTS OF A MEDICAL DEVICE, SYSTEM AND METHOD THEREOF

(71) Applicant: Coherex Medical, Inc., Salt Lake City, UT (US)

(72) Inventor: Sung K. Lee, West Jordan, UT (US)

(73) Assignee: Coherex Medical, Inc., Salt Lake City, UT (US)

( * ) Notice: Subject to any disclaimer, the term of this patent is extended or adjusted under 35 U.S.C. 154(b) by 763 days.

(21) Appl. No.: 17/571,163

(22) Filed: Jan. 7, 2022

(65) Prior Publication Data

US 2023/0218303 A1     Jul. 13, 2023

(51) Int. Cl.
*A61B 17/12*     (2006.01)

(52) U.S. Cl.
CPC .. *A61B 17/12177* (2013.01); *A61B 17/12122* (2013.01); *A61B 17/1214* (2013.01)

(58) Field of Classification Search
CPC ........ A61B 17/12122; A61B 17/12177; A61B 17/1214; A61B 17/12168; A61B 17/12172; A61B 2017/1205; A61B 2017/12054; A61B 17/0057; A61B 2017/00575; A61B 2017/00592
See application file for complete search history.

(56) References Cited

U.S. PATENT DOCUMENTS

| | | | |
|---|---|---|---|
| 8,690,911 B2 | 4/2014 | Miles et al. | |
| 8,795,328 B2 | 8/2014 | Miles et al. | |
| 8,840,641 B2 | 9/2014 | Miles et al. | |
| 8,845,711 B2 | 9/2014 | Miles et al. | |
| 9,351,716 B2 | 5/2016 | Miles et al. | |
| 9,649,115 B2 | 5/2017 | Edmiston et al. | |
| 9,693,781 B2 | 7/2017 | Miles et al. | |
| 9,883,864 B2 | 2/2018 | Miles et al. | |
| 10,064,628 B2 | 9/2018 | Edmiston et al. | |
| 10,631,969 B2 | 4/2020 | Edmiston et al. | |
| 2010/0324588 A1 * | 12/2010 | Miles | A61B 17/0057 606/198 |
| 2014/0364941 A1 * | 12/2014 | Edmiston | A61B 17/12177 623/2.11 |
| 2019/0231356 A1 * | 8/2019 | Deville | A61B 17/1285 |
| 2020/0345375 A1 * | 11/2020 | Deville | A61B 17/1285 |

* cited by examiner

*Primary Examiner* — Katherine H Schwiker
*Assistant Examiner* — Zehra Jaffri
(74) *Attorney, Agent, or Firm* — David L. Stott (57) ABSTRACT

Medical devices, systems and methods for occluding a left atrial appendage of a heart. In one embodiment, a medical device system includes a pusher catheter with a medical device coupled adjacent a distal end of the pusher catheter. The medical device includes a primary hub and a secondary hub with a framework extending therebetween, the primary hub including grooves defined therein. The framework is moveable between constricted and expanded positions such that as the framework moves to the constricted position the grooves are configured to align portions of the framework as the secondary hub moves through the bore of the primary hub. In another embodiment, components of the framework may be configured to minimize resistance in the system as the medical device is delivered and moved between the constricted and expanded positions.

16 Claims, 7 Drawing Sheets

FRAME COMPONENTS OF A MEDICAL DEVICE, SYSTEM AND METHOD THEREOF

TECHNICAL FIELD

The present invention relates generally to the occlusion of tissue openings or appendages and, more specifically, to devices, systems and methods for occluding or otherwise structurally altering such openings and appendages including, for example, left atrial appendages.

BACKGROUND

The upper chambers of the heart, the atria, have appendages attached to each of them. For example, the left atrial appendage is a feature of all human hearts. The physiologic function of such appendages is not completely understood, but they do act as a filling reservoir during the normal pumping of the heart. The appendages typically protrude from the atria and cover an external portion of the atria. Atrial appendages differ substantially from one to another. For example, one atrial appendage may be configured as a tapered protrusion while another atrial appendage may be configured as a re-entrant, sock-like hole. The inner surface of an appendage is conventionally trabeculated with cords of muscular cardiac tissue traversing its surface with one or multiple lobes.

The atrial appendages appear to be inert while blood is being pumped through them during normal heart function. In other words, the appendages do not appear to have a noticeable effect on blood pumped through them during normal heart function. However, in cases of atrial fibrillation, when the atria go into arrhythmia, blood may pool and thrombose inside of the appendages. Among other things, this can pose a stroke risk when it occurs in the left appendage since the thrombus may be pumped out of the heart and into the cranial circulation once normal sinus rhythm is restored following arrhythmia events.

Historically, appendages have sometimes been modified surgically to reduce the risk imposed by atrial fibrillation. In recent years devices which may be delivered percutaneously into the left atrial appendage have been introduced. The basic function of these devices is to exclude the volume within the appendage with an implant which then allows blood within the appendage to safely thrombose and then to be gradually incorporated into cardiac tissue. This process, coupled with the growth of endothelium over the face of the device, can leave a smooth, endothelialized surface where the appendage is located. In comparison to surgical procedures, devices implanted percutaneously are a less invasive means for addressing the problems associated with the left atrial appendage.

However, due to the wide variability of the ostium size and volume of the left atrial appendage, most current implantable devices include structure that cannot meet such variability, resulting in inadequate devices for many left atrial appendage anatomies. One important aspect to minimize the effects in the variability of ostium size is the ability to disengage and re-anchor the medical device within the left atrial appendage, if the physician believes a better position is attainable, such that the medical device has the ability to be disengaged from the tissue, manipulated, and then re-anchored to the tissue, and repeating the steps until the physician is satisfied with the position of the medical device at the ostium of the left atrial appendage, similar to that disclosed in commonly assigned U.S. Pat. No. 9,693,780 to Miles et al., the disclosure of which is incorporated by reference herein in its entirety. However, one problem with repeatedly anchoring and disengaging the medical device is the potential of tangling components of the medical device due to the dynamic forces of the beating heart being placed upon the medical device while the physician anchors the medical device in the heart, such as the left atrial appendage. Another problem that is often found in percutaneous delivery systems involves resistance between the various components of the medical device and its delivery system. Such resistance may minimize the tactile feel of the physician while delivering the medical device.

A variety of features and advantages will be apparent to those of ordinary skill in the art upon reading the description of various embodiments set forth below.

BRIEF SUMMARY OF THE INVENTION

Embodiments of the present invention are directed to various devices, systems and methods for delivering a medical device. In one embodiment, a medical device system for occluding a left atrial appendage of a heart is provided. The medical device includes a delivery catheter and a sheath, the delivery catheter includes a medical device coupled adjacent a delivery catheter distal end of the delivery catheter. The sheath extends with a wall between a distal end and a proximal end with a central lumen and central axis defined in the sheath along a longitudinal length of the sheath such that the medical device and delivery catheter are advanceable through the central lumen of the sheath. Further, the sheath defines a concentric lumen therein so as to extend along the wall, the sheath being deflectable with a first deflectable portion relative to a first pivot location along a distal portion of the sheath and the sheath being deflectable with a second deflectable portion relative to a second pivot location along the distal portion of the sheath. With this arrangement, at least one of the first pivot location and the second pivot location of the first and second deflectable portions, respectively, is adjustable along the longitudinal length of the distal portion of the sheath.

In another embodiment, upon the at least one of the first and second pivot locations being adjusted, a radius of at least one of the first and second deflectable portions is adjusted. In a further embodiment, the radius increases upon the at least one of the first and second pivot locations being moved proximally along the length of the sheath and, the radius decreases upon the at least one of the first and second pivot locations being moved distally along the length of the sheath.

In another embodiment, the sheath includes a slidable tubular member with a distal end, the slidable tubular member positioned within the concentric lumen defined in the sheath, the distal end of the slidable tubular member defining at least one of the first and second pivot locations of the sheath. In a further embodiment, the slidable tubular member is linearly slideable within the concentric lumen to change the at least one of the first and second pivot locations of the sheath.

In another embodiment, the slidable tubular member includes openings defined therein, the openings sized and configured to hold control wires therein so that the control wires extend distal of at least one of the first and second pivot locations for controlling deflection of at least one of the first and second deflectable portions, respectively. In another embodiment, the first and second deflectable portions are deflectable in multiple directions. In still another embodiment, the sheath is separately and independently deflectable relative to the first pivot location and the second pivot location along the sheath.

In another embodiment, the first and second deflectable portions are deflectable with a control actuator integrated in a sheath handle of the sheath, the control actuator including at least one of a rack and pinion system, a pneumatic system, and a hydraulic system. In another embodiment, the at least one of the first and second deflectable portions are deflectable with multiple wires extending through the concentric lumen along the longitudinal length of the sheath, the multiple wires having a first portion and a second portion with a transition point between the first and second portions, the first portion being distal of and more flexible than the second portion, the transition point of the multiple wires being moveable along the longitudinal length to change a radius of the at least one of the first and second deflectable portions.

In accordance with another embodiment of the present invention, a medical device system for occluding a left atrial appendage of a heart with an implant, the implant positioned adjacent a delivery catheter, is provided. The medical device includes a sheath such that the sheath extends with a wall between a distal end and a proximal end with a central lumen and central axis defined in the sheath along a longitudinal length of the sheath such that the implant and delivery catheter are advanceable through the central lumen of the sheath. The sheath defines a concentric lumen therein so as to extend along the wall, the sheath being deflectable with a first deflectable portion relative to a first pivot location along a distal portion of the sheath and the sheath being deflectable with a second deflectable portion relative to a second pivot location along the distal portion of the sheath. With this arrangement, at least one of the first pivot location and the second pivot location of the first and second deflectable portions, respectively, is adjustable along the longitudinal length of the distal portion of the sheath.

In another embodiment, upon the at least one of the first and second pivot locations being adjusted, a radius of at least one of the first and second deflectable portions is adjusted. In a further embodiment, the radius increases upon the at least one of the first and second pivot location being moved proximally along the length of the sheath and, wherein the radius decreases upon the at least one of the first and second pivot location being moved distally along the length of the sheath.

In another embodiment, the sheath includes a slidable tubular member with a distal end, the slidable tubular member positioned within the concentric lumen defined in the sheath, the distal end of the slidable tubular member defining at least one of the first and second pivot locations of the sheath. In still another embodiment, the slidable tubular member is linearly slideable within the concentric lumen to change the at least one of the first and second pivot locations of the sheath. In another embodiment, the slidable tubular member includes openings defined therein, the openings sized and configured to hold control wires therein so that the control wires extend distal of at least one of the first and second pivot locations for controlling deflection of at least one of the first and second deflectable portions, respectively.

In another embodiment, the first and second deflectable portions are deflectable in multiple directions. In still another embodiment, the sheath is separately and independently deflectable relative to the first pivot location and the second pivot location along the sheath. In another embodiment, the first and second deflectable portions are deflectable with a control actuator integrated in a sheath handle of the sheath, the control actuator including at least one of a rack and pinion system, a pneumatic system, and a hydraulic system. In another embodiment, at least one of the first and second deflectable portions are deflectable with multiple wires extending through the concentric lumen along the longitudinal length of the sheath, the multiple wires having a first portion and a second portion with a transition point between the first and second portions, the first portion being distal of and more flexible than the second portion, the transition point of the multiple wires being moveable along the longitudinal length to change a radius of the at least one of the first and second deflectable portions.

In accordance with another embodiment of the present invention, a method for axially aligning a distal end of medical device delivery system with an ostium of a left atrial appendage of a heart is provided. The method steps include positioning a distal end of a sheath adjacent the left atrial appendage of the heart, the sheath extending with a wall between a distal end and a proximal end with a central lumen and central axis defined in the sheath along a longitudinal length of the sheath such that an implant and delivery catheter are advanceable through the central lumen of the sheath, the sheath defining a concentric lumen therein so as to extend along the wall, the sheath being deflectable with a first deflectable portion relative to a first pivot location along a distal portion of the sheath and the sheath being deflectable with a second deflectable portion relative to a second pivot location along the distal portion of the sheath; and adjusting at least one of the first pivot location and the second pivot location of the first and second deflectable portions, respectively, along the longitudinal length of the distal portion of the sheath.

In another embodiment, the adjusting step includes adjusting a radius of at least one of the first and second deflectable portions. In still another embodiment, the adjusting the radius step includes increasing the radius of the at least one of the first and second deflectable portions by moving the at least one of the first and second pivot locations proximally along the length of the sheath. In yet another embodiment, the adjusting step includes sliding a tubular member within the concentric lumen such that a distal end of the tubular member corresponds with at least one of the first and second pivot locations of the first and second deflectable portions, respectively. In another embodiment, the adjusting step includes moving one or more control wires proximally or distally to move the at least one of the first and second pivot locations along the length of the sheath.

In accordance with another embodiment of the present invention, a medical device system is provided. The medical device system includes a sheath, a pusher catheter, and a medical device. The sheath extends longitudinally to define a lumen and an axis along a length of the sheath. The pusher catheter extends longitudinally between a proximal end and a distal end, the proximal end being associated with a handle. The pusher catheter is sized and configured to be moved through the lumen of the sheath. The medical device is configured to be coupled adjacent the distal end of the pusher catheter, the medical device including a framework moveable between a constricted position and a deployed position. The framework extends to define an elongate structure with an eyelet structure extending adjacent to one end of the elongate structure, the elongate structure defining a line extending tangentially along the elongate structure adjacent the one end, the eyelet structure extending from the elongate structure such that the eyelet structure extends along a single side of the tangentially extending line. With this arrangement, upon the medical device being in the constricted position, the eyelet structure positioned along the single side of the tangentially extending line minimizes resistance of the medical device against an internal surface of the sheath.

In another embodiment, the framework extends to define an occluder frame and an anchor frame, the occluder frame hingeably coupled to the anchor frame with a hinge component positioned in the eyelet structure. In another embodiment, the anchor frame includes an anchor frame eyelet, the hinge component positioned through both the anchor frame eyelet and the eyelet structure. In still another embodiment, the eyelet structure includes a first eyelet and a second eyelet with a gap therebetween, the anchor frame eyelet positioned in the gap so that the hinge component extends through each of the first and second eyelets and the anchor frame eyelet.

In accordance with another embodiment of the present invention, a medical device system configured to minimize resistance relative to an internal surface of a sheath is provided. The medical device system includes a pusher catheter and a medical device. The pusher catheter extends longitudinally between a proximal end and a distal end, the proximal end being associated with a handle. The pusher catheter is sized and configured to be moved through the lumen of the sheath. The medical device is configured to be coupled adjacent the distal end of the pusher catheter, the medical device including a framework moveable between a constricted position and a deployed position. The framework extends to define an elongate structure with an eyelet structure positioned adjacent to one end of the elongate structure, the elongate structure defining a line extending tangentially along the elongate structure adjacent the one end. The eyelet structure extends from the elongate structure such that the eyelet structure extends along a single side of the tangentially extending line. With this arrangement, upon the medical device being in the constricted position, the eyelet structure positioned along the single side of the tangentially extending line minimizes resistance of the medical device against the internal surface of the sheath.

In another embodiment, the framework extends to define an occluder frame and an anchor frame, the occluder frame hingeably coupled to the anchor frame with a hinge component positioned in the eyelet structure. In a further embodiment, the anchor frame includes an anchor frame eyelet, the hinge component positioned through both the anchor frame eyelet and the eyelet structure. In another embodiment, the eyelet structure includes a first eyelet and a second eyelet with a gap therebetween, the anchor frame eyelet positioned in the gap so that the hinge component extends through each of the first and second eyelets and the anchor frame eyelet.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
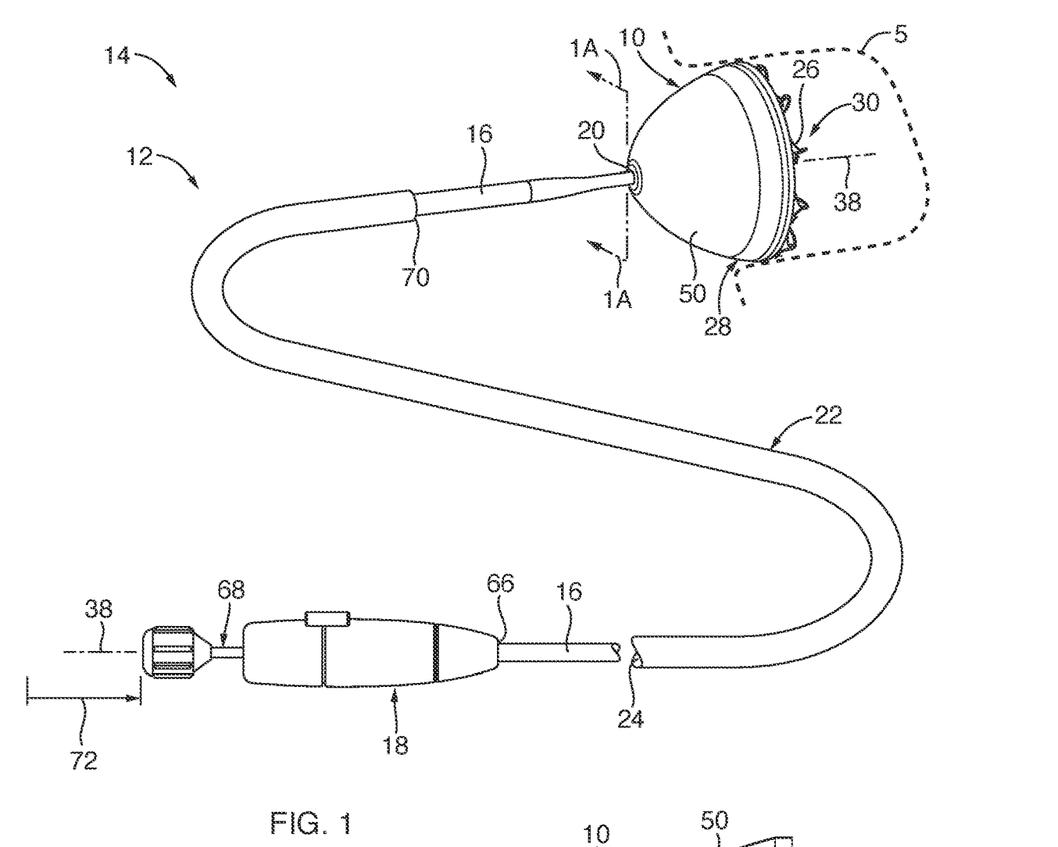
FIG. 1 is a perspective view of a medical device system, depicting a medical device coupled to delivery system, according to one embodiment of the present invention.
Figure 1A:
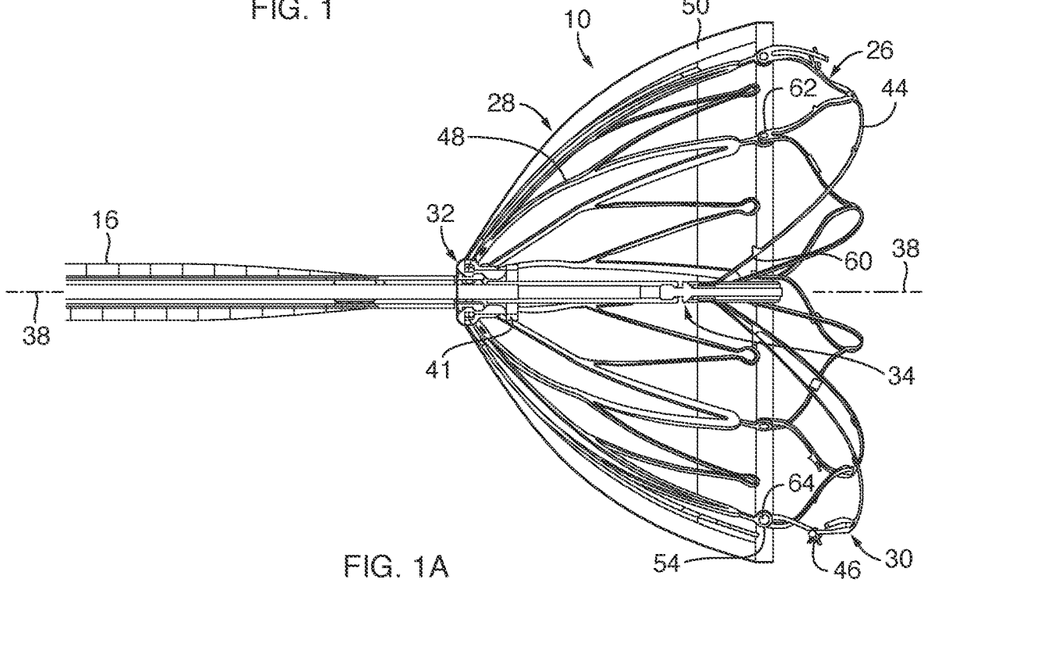
FIG. 1A is a partial cross-sectional view of the medical device system taken along section line 1A-1A of FIG. 1, depicting an anchor portion of the medical device in a deployed position, according to another embodiment of the present invention.

Referring to FIGS. 1, 1A, 2, 2A and 7, a medical device 10 removably coupled to a delivery system 12 is provided. The medical device 10 and delivery system 12 together may be referenced as a medical device delivery system 14, which may be employed in interventional procedures for percutaneously closing and modifying an opening or cavity such as, for example, a left atrial appendage 5 within a heart (not shown). The delivery system 12 may include a pusher catheter 16 and a handle 18, the pusher catheter 16 being coupled to the medical device 10 adjacent a distal end 20 of the pusher catheter 16. Also, the delivery system 12 may include a sheath 22 sized and configured to facilitate advancing the medical device 10 through a lumen 24 of the sheath with the pusher catheter (see also FIG. 3). In addition, the medical device 10 may include a framework 26 or frame structure extending to define an occluder portion 28 and an anchor portion 30. Further, the medical device 10 may include a primary hub 32 and a secondary hub 34 such that the framework 26 may extend between the primary hub 32 and the secondary hub 34. The primary hub 32 may define a bore 36 and an axis 38 that each may extend through the primary hub 32 such that the axis 38 may extend axially relative to the bore 36 and structure of the primary hub 32. Such axis 38 may also extend axially along a length of the medical device delivery system 14 and the components thereof. In one embodiment, the primary hub 32 may include grooves 40 defined in an alignment portion 41 of the primary hub 32 and adjacent the bore 36. Further, the secondary hub 34 may be moveable along the axis 38 and through the primary hub 32 so as to move the framework 26 between a constricted position (FIG. 2A) and a deployed position (FIG. 1A). With this arrangement, as the secondary hub 34 moves along the axis 38 and through the bore 36 of the primary hub 32, the grooves 40 may be sized and configured to align portions of the framework 26 so that tangling of the framework 26 may be minimized as the framework 26 moves between the constricted and deployed positions. Furthermore, upon the framework 26 at least partially being constricted within the sheath 22, the framework 26 may extend with structure that may minimize resistance with an internal surface 42 of the sheath 22, discussed further herein (see FIG. 9).

Figure 4:
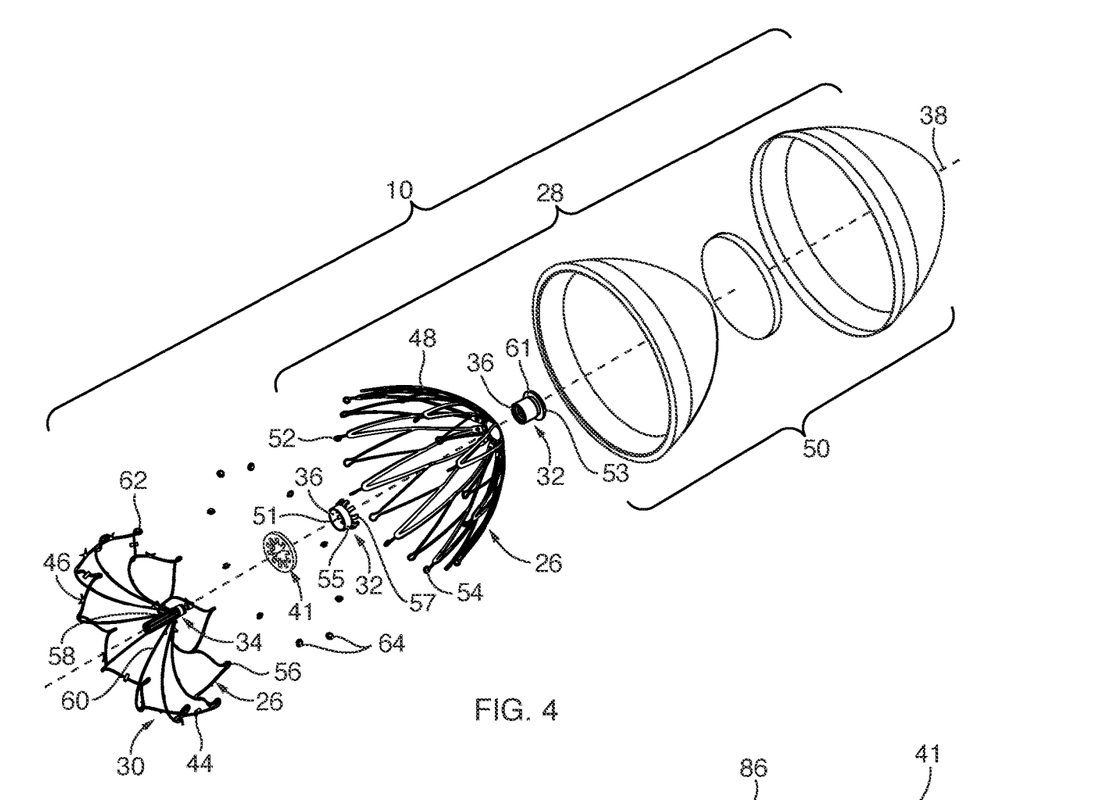
FIG. 4 is an exploded view of components of the medical device, according to another embodiment of the present invention.

Now with reference to FIGS. 1, 1A, and 4, as previously set forth, the framework 26 may extend with the occluder portion 28 and the anchor portion 30. The anchor portion 30 may extend with an anchor frame 44 with anchor tines 46 extending therefrom. The occluder portion 28 may include an occluder frame 48 with a tissue growth member 50 attached to the occluder frame 48. The tissue growth member 50 may be in the form of an occlusive member, but may also be in the form of a filter member, a mesh member, a membrane or any other structure, or combinations thereof, sized and configured to promote tissue in-growth. Further, the tissue growth member 50 may be formed from one or more polymeric materials, such as ePTFE and/or a polyurethane foam. Further, the tissue growth member 50 may extend with multiple layers with varying thicknesses and sizes.

Further, the occluder frame 48 may be coupled to the primary hub 32 such that the occluder frame 48 may extend radially outward from the primary hub 32 and may extend distally to an occluder frame distal end 52. Adjacent to the distal end 52 of the occluder frame 48, the occluder frame 48 may include multiple occluder frame eyelets 54 defined in the occluder frame 48. The anchor frame 44 may extend between a first end 56 and a second end 58, the first end 56 coupled to the occluder frame 48 and the second end 58 coupled to the secondary hub 34. The anchor frame 44 may extend with multiple anchor frame segments 60, interconnected to each other, extending between the first and second ends 56, 58 of the anchor frame 44. Adjacent to the first end 56 of the anchor frame 44, the anchor frame 44 may include multiple anchor frame eyelets 62 along multiple ones of the anchor frame segments 60 of the anchor frame 44. At the secondary hub 34, multiple ones of the anchor frame segments 60 or anchor frame extensions may be coupled to the secondary hub 34. Each of the occluder frame eyelets 54 may be coupled to a corresponding one of the anchor frame eyelets 62 with a hinge component 64. The hinge component 64 may extend through the occluder frame eyelet 54 and the anchor frame eyelet 62 so as to facilitate the anchor frame 44 to pivot about the hinge component 64 so as to pivot or rotate relative to the occluder frame 48. With this arrangement, the anchor frame 44 may be pivotably coupled (or hingeably coupled) to the occluder frame 48 so that the anchor frame 44 may move between a retracted position (FIG. 2A) and a deployed position (FIG. 1A). The retracted position of the anchor frame 44 may also be an anchor constrained position or a pivoted position. As such, the pivoting between the retracted and deployed positions of the anchor frame 44 may assist a physician in adjusting the position of the medical device 10 subsequent to the anchor portion 30 being secured to tissue in, for example, the left atrial appendage 5.

Figure 7:
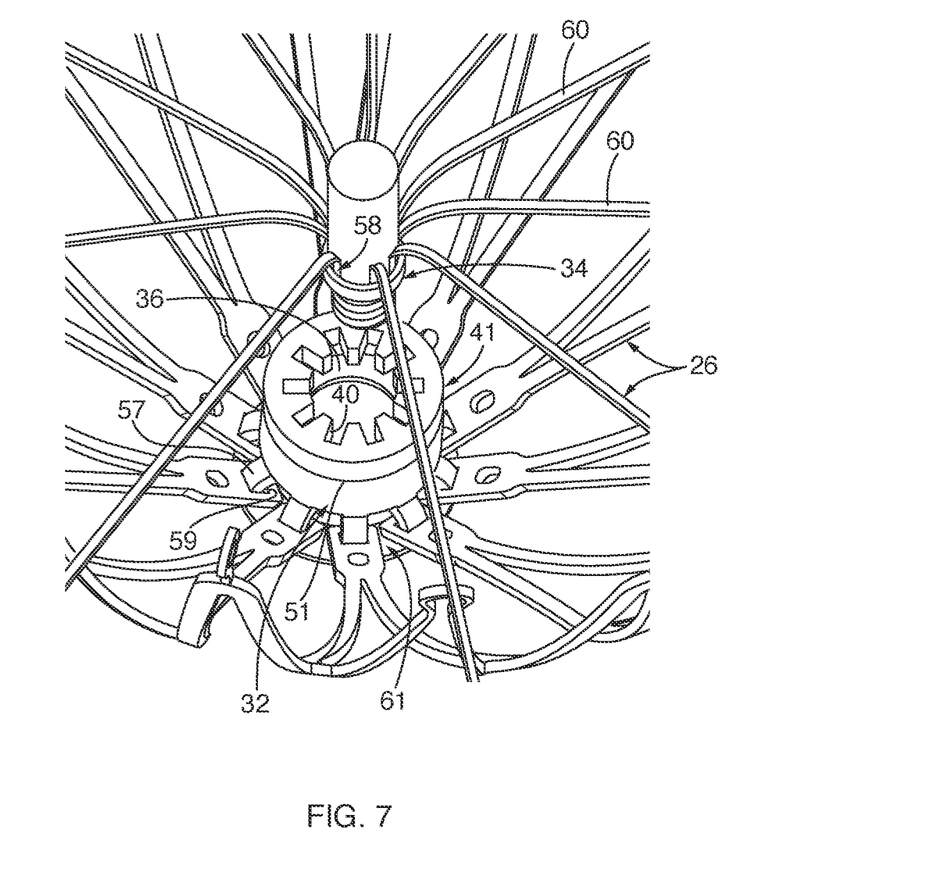
FIG. 7 is an enlarged perspective view of the medical device with the alignment portion coupled to the hub, depicting the secondary hub disengaged from an anchor actuator and aligned with and positioned adjacent the primary hub of the medical device, according to another embodiment of the present invention.

As depicted in FIGS. 1A, 4 and 7, in one embodiment, the alignment portion 41 may be axially positioned and aligned along the axis 38 so as to be coupled to a distal side 51 of a portion of the primary hub 32. Further, such primary hub 32 may include a first part 53 and a second part 55, the first part 53 sized and configured to be coupled to the second part 55 with fingers 57 interlocking with and through occluder connection openings 59 defined in the occluder frame 48 adjacent a proximal end of the occluder frame 48. Such fingers 57 may be maintained in the occluder connection openings 59 with the fingers 57 positioned against a back stop 61 of the first part 53 of the primary hub 32. In this manner, the first and second parts 53, 55 of the primary hub 32 may be coupled to the occluder frame 48 with the alignment portion 41 positioned on the distal side 51 of a portion of the primary hub 32, such as along the distal side 51 of the second part 55 of the primary hub 32.

Figure 2:
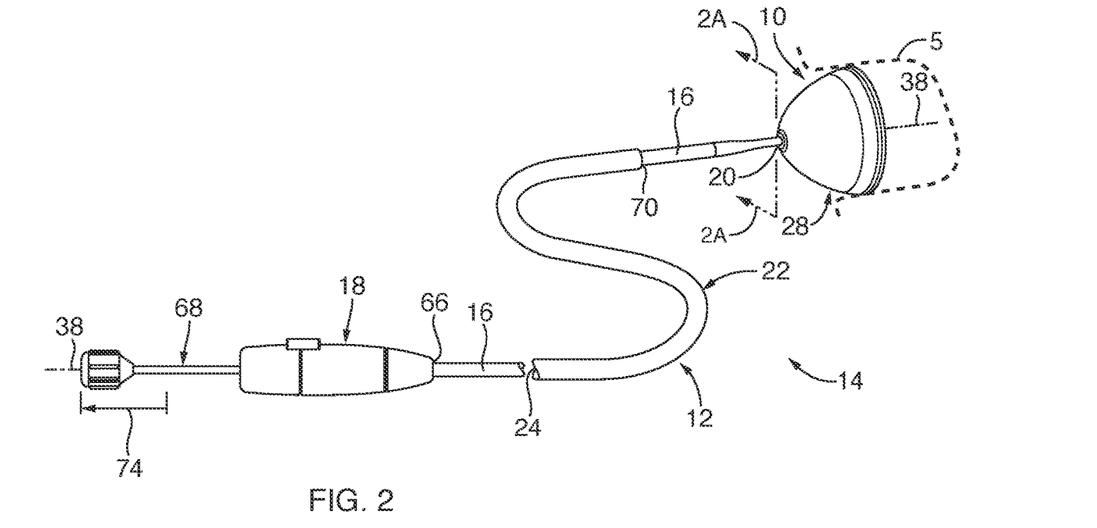
FIG. 2 is a perspective view of the medical device system, depicting the anchor portion of the medical device retracted with an anchor actuator of a handle of the delivery system, according to another embodiment of the present invention.
Figure 2A:
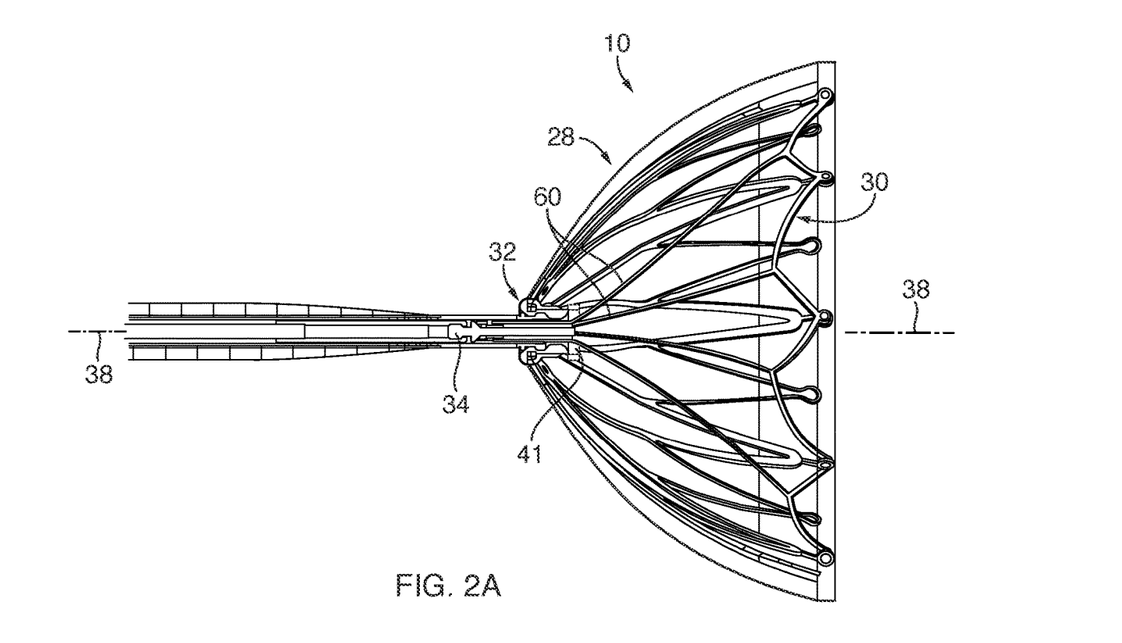
FIG. 2A is a partial cross-sectional view of the medical device system taken along section line 2A-2A of FIG. 2, depicting the anchor portion in a retracted position, according to another embodiment of the present invention.
Figure 3:
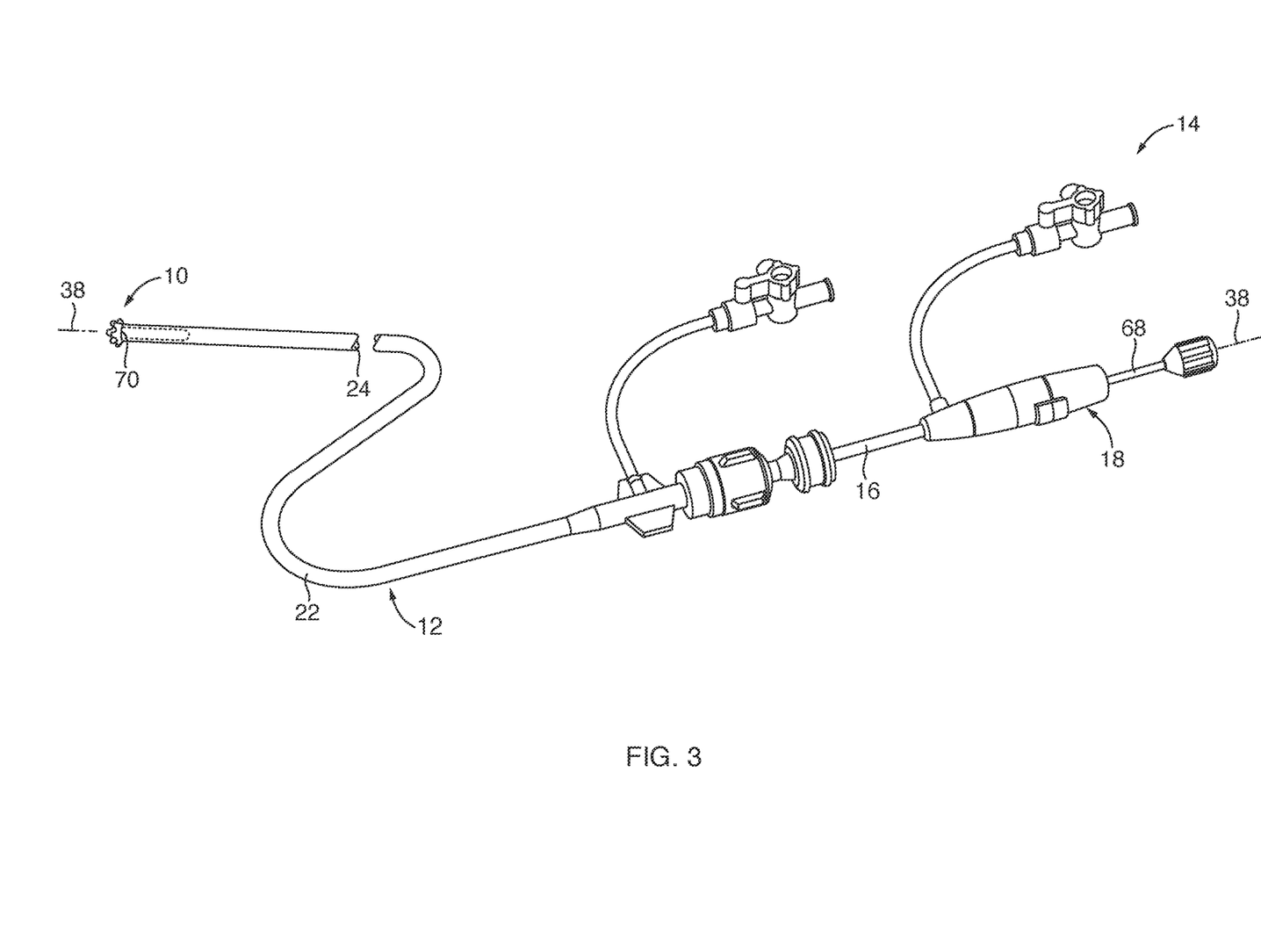
FIG. 3 is a perspective view of the medical device system, depicting the medical device at least partially constricted within a sheath of the medical device system, according to another embodiment of the present invention.

With reference to FIGS. 1-3, as previously set forth, the medical device 10 may be delivered through the vasculature with the delivery system 12. The delivery system 12 may include the pusher catheter 16 and the handle 18, the handle 18 integrated with a proximal portion 66 of the pusher catheter 16. The handle 18 may include various functional components, such as an anchor actuator 68, to manipulate the anchor frame 44 between the deployed position (FIG. 1A) and the retracted position (FIG. 2A). The delivery system 12 may include and be employed with a sheath 22 for delivering the medical device 10 through the vasculature and to the left atrial appendage 5 in the heart. The sheath 22 may be positioned within the vasculature using known interventional techniques with a sheath distal end 70 to be positioned adjacent the left atrial appendage 5 of the heart. Upon the medical device 10 being advanced through the lumen 24 of the sheath 22 to the sheath distal end 70 (the medical device 10 being in the constricted position partially shown in dashed lines adjacent the sheath distal end 70 (see FIG. 3)), the medical device 10 may at least partially be deployed from the sheath 22. That is, the sheath 22 may then be manually moved proximally (and/or the pusher catheter 16 advanced distally) so that the occluder portion 28 of medical device 10 may be deployed from the sheath distal end 70 (see FIG. 2). Such occluder portion 28 may immediately self-expand as the occluder portion 28 is exposed from the sheath distal end 70. At this stage, the medical device 10 may be in a partially deployed state, after which, the medical device 10 may be moved to a fully deployed state by deploying the anchor portion 30 (see FIG. 1). For example, upon the occluder portion 28 initially being deployed, the anchor portion 30 may be in the retracted position with the anchor actuator 68 of the handle 18 in the proximal position (as depicted in FIG. 2). Once a physician determines that the occluder portion 28 is in an appropriate and desired position adjacent the left atrial appendage 5, the anchor portion 30 may be pivoted from the retracted position to the deployed position by moving the anchor actuator 68 to the distal position, as shown by arrow 72 (see FIG. 1). Once the anchor portion 30 is moved to the deployed position, the tines 46 (FIG. 1A)) of the anchor portion 30 may engage tissue to secure the medical device 10 in the left atrial appendage 5. If the physician determines that the medical device 10 is not in an optimal secured position in the left atrial appendage 5, the anchor portion 30 may be pivoted back to the retracted position by moving the anchor actuator 68 from the distal position to the proximal position, as shown by arrow 74 (see FIG. 2). As such, the anchor actuator 68 may be manually moved proximally and distally to move the anchor portion 30 between the retracted and deployed positions such that the anchor portion 30 pivots between the deployed and retraced positions. In this manner, the anchor portion 30 of the medical device 10 may be secured and disengaged from tissue in the left atrial appendage 5 as needed by the physician until the physician obtains an optimal position or is satisfied with its position prior to releasing the delivery system 12 from the medical device 10. A similar medical device delivery system 14 with its handle 18, pusher catheter 16, medical device 10 and delivery sheath 12 is disclosed in commonly assigned U.S. patent application Ser. No. 15/438,650, filed on Feb. 21, 2017, now issued as U.S. Pat. No. 10,631,969 entitled MEDICAL DEVICE FOR MODIFICATION OF LEFT ATRIAL APPENDAGE AND RELATED SYSTEMS AND METHODS, the disclosure of which is incorporated by reference herein in its entirety.

Figure 5:
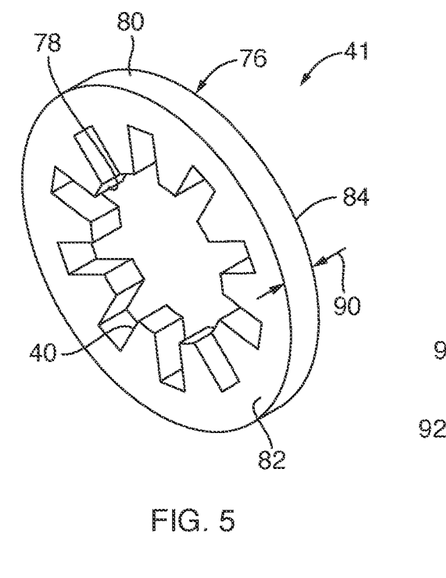
FIG. 5 is a perspective view of an alignment portion of the medical device, according to another embodiment of the present invention.
Figure 6:
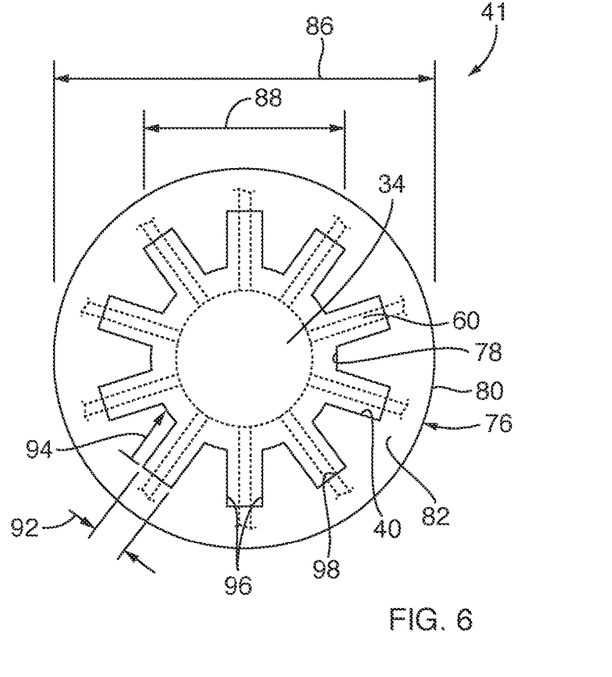
FIG. 6 is a front view of the alignment portion, depicting components of the anchor portion in the retracted position with a secondary hub and anchor frame segments in dashed lines, according to another embodiment of the present invention.

Now with reference to FIGS. 2A and 5-7, further description of the alignment portion 41 will now be provided. For example, as previously set forth, the alignment portion may be coupled to or integrated with or in the primary hub 32. The alignment portion 41 may be sized and configured to assist the anchor frame 44 to move between the before described deployed position FIG. 1A) and the retracted position (FIG. 2A) in a manner to minimize tangling of anchor frame segments 60 or anchor extensions of the anchor frame 44. Further, as the secondary hub 34 moves through the bore 36 of the primary hub 32, the grooves 40 defined in the alignment portion 41 of the primary hub 32 may be sized and configured to maintain the anchor frame segments 60 in a spaced and aligned manner to minimize potential tangling of the anchor frame segments 60 as the medical device moves between retracted and deployed positions. For example, FIG. 6 depicts a distal side or front view of the alignment portion 41 with the anchor frame segments 60 and secondary hub 34 shown in dashed lines. Further, the secondary hub 34, depicted in FIG. 6, may be in a position similar to that depicted in FIG. 2A with the secondary hub 34 in a proximal most position. As such, each of the grooves 40 of the alignment portion 41 may be spaced to correspond and be aligned with the spacing and position of each of the anchor frame segments 60 relative to their respective second end 58 attachment to the secondary hub 34. FIG. 7 depicts a distal side perspective view of the alignment portion 41 integrated with the primary hub 32 with the secondary hub 34 disengaged or released from a distal most end of the anchor actuator 68 (FIG. 1).

In one embodiment, the alignment portion 41 may be a ring structure 76 with the grooves 40 defined therein that may be coupled to a distal side of the primary hub 32. In another embodiment, the alignment portion 41 may be integrally formed with the primary hub 32. In another embodiment, the alignment portion 41 may extend with an inner surface 78 and an outer surface 80 each defined between first and second side surfaces 82, 84. The ring structure 76 may extend to define an outer diameter 86, the outer diameter 86 extending to define the outer surface 80 of the ring structure 76. The ring structure 76 may also define an inner diameter 88, the inner diameter 88 extending to define the inner surface 78 of the ring structure 76. The first and second side surfaces 82, 84 may be spaced relative to each other to define a depth 90 of the ring structure 76. In another embodiment, the inner surface 78 and the outer surface 80 may extend with the depth 90 such that the depth 90 is a common dimension between the inner and outer surfaces 78, 80. In another embodiment, the inner surface 78 may define a first depth and the outer surface 80 may define a second depth, the second depth being larger than the first depth. In another embodiment, the first depth of the inner surface 78 may be larger than the second depth of the outer surface 80. In still another embodiment, the inner surface 78 may define a generally circular shape, but for the grooves 40 defined therein. In another embodiment, the outer surface 80 may extend to define a circular shape.

As previously described, the inner surface 78 may define the grooves 40 therein. The grooves 40 may also be referenced as slots, notches or channels. The grooves 40 may be sized and configured to facilitate the anchor frame segments 60 adjacent the secondary hub 34 to move along the grooves 40 as the secondary hub 34 moves along the axis 38. In another embodiment, the grooves 40 may be evenly spaced along the inner surface 78 of the ring structure 76 such that each groove 40 may correspond with one of the anchor frame segments 60 extending from the secondary hub 34. In another embodiment, the grooves 40 may be radially spaced and defined in the inner surface 78 of the ring structure 76. In another embodiment, each groove 40 may be defined with two opposingly positioned walls 96 and one lateral wall 98 extending between the opposingly positioned walls 96. In one embodiment, each of the opposingly positioned walls 96 may extend generally parallel. As such, each groove 40 may define a gap 92 between the two opposingly positioned walls 96 and a height 94 defined from the lateral wall 98 and the inner surface 78 of the ring structure 76. Further, the anchor frame segments 60 or anchor extensions may extend to define a generally square or rectangular cross-section that may be sized smaller than corresponding dimensions of the above-described gap 92 and height 94 defining each of the grooves 40. Furthermore, the inner diameter 88 of the ring structure 76 may be sized so as to be larger than the diameter or width of the secondary hub 34 so that the secondary hub 34 may readily be moved along the axis 38 and into and/or through the bore 36 of the primary hub 32. With this arrangement, as the secondary hub 34 moves through the bore 36 of the primary hub 32, the grooves 40 of the alignment portion 41 of the primary hub 32 may control the spacing and alignment between adjacently extending anchor frame segments 60 so as to minimize tangling of various components of the anchor frame upon adjusting the medical device 10 to various positions within or adjacent tissue of, for example, the left atrial appendage 5.

Figure 8:
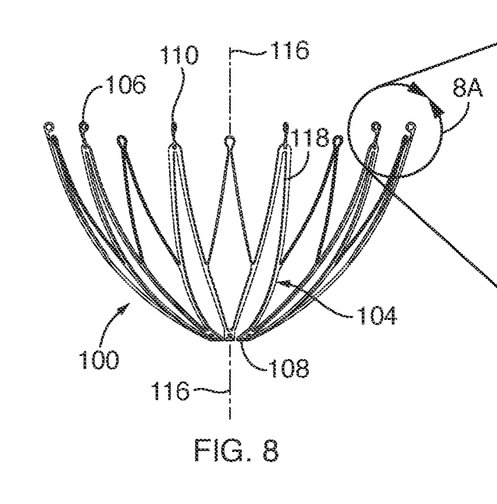
FIG. 8 is a side view of an occluder portion of the medical device, according to another embodiment of the present invention.
Figure 8A:
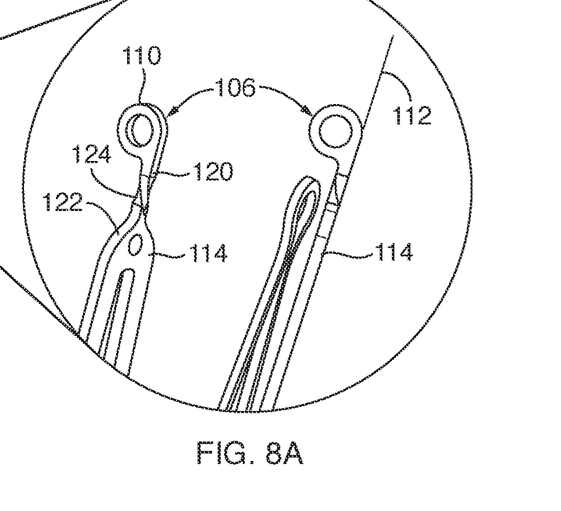
FIG. 8A is an enlarged view of the occluder portion taken from region 8A of FIG. 8, depicting eyelet structure of the occluder portion, according to another embodiment of the present invention.
Figure 9:
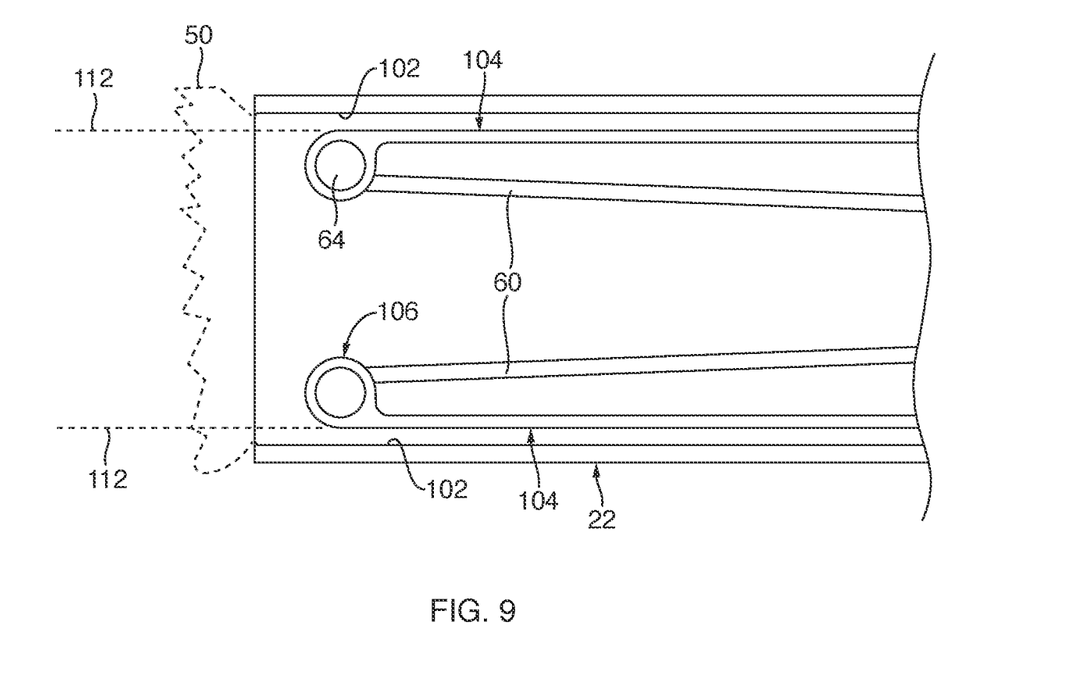
FIG. 9 is a simplified cross-sectional view of an end portion of the delivery system, depicting a profile of the hinge eyelet relative to an inner surface of the sheath and relative to elongate portion of the occluder portion, according to another embodiment of the present invention.

Now with reference to FIGS. 8, 8A and 9, another embodiment of an occluder frame 100 that may be implemented with the medical device delivery system 14 (FIG. 3), set forth herein. Upon the occluder frame 100 at least partially being constricted within the sheath 22, the occluder frame 100 may extend with structure that may minimize resistance with an internal surface 102 of the sheath 22, as previously set forth. For example, the occluder frame 100 may extend with multiple occluder frame segments 106 that each may extend radially outward from a proximal end 108 toward a distal end 110 of the occluder frame 100. Some of the occluder frame segments 104 may define structure adjacent the distal end that may define occluder frame eyelets 106 of the occluder frame 100. Such structure defining each of the occluder frame eyelets 106 may be formed to extend along a single side of a tangent line 112 that may be defined to extend along an outer side 114 of a portion of the occluder frame segment 104 that leads, and is adjacent, to the corresponding one of the occluder frame eyelets 106.

In one embodiment, the occluder frame 100 may be formed from a flat sheet of Nitinol material and laser cut to form the multiple occluder frame segments 104. The occluder frame segments 104 of the occluder frame 100 may be heat set in a predetermined shape and configuration such that each of the occluder frame segments 104 may extend radially outward relative to an axis 116 and be interconnected to the primary hub 32 (see FIG. 1A) toward the distal end 110 of the occluder frame 100. In one embodiment, alternating ones of the occluder frame segments 104 may each extend with elongated portions 118, a neck portion 120, and the occluder frame eyelet 106, each of occluder frame segments 104 initially being formed within or along a commonly defined plane as each are cut from flat sheet material as a monolithic, seamless one piece structure. The elongated portions 118 may extend distally to an intersection portion 122. Each occluder frame segment 104 may extend with a pair of the elongated portions 118. In regard to the occluder frame segments 104 with the occluder frame eyelets 106, the neck portion 120 may extend from the intersection portion 122 and continue to extend distally to the occluder frame eyelet 106. The neck portion 120 may be more narrow than the structure of the occluder frame eyelet 106. Further, the neck portion 120 may extend with a twisted structure 124. Such twisted structure 124 defined in the neck portion 120 may be formed via heat setting as a result of twisting the flat structure of the occluder frame eyelet 106 to extend about ninety degrees relative to the flat structure of the remaining portion of the occluder frame segment 104. In one embodiment, the occluder frame eyelet 106 may be formed such that, upon the occluder frame eyelet 106 being twisted ninety degrees, the structure of the occluder frame eyelet 106 may extend along a single side of the tangent line 112 defined along the outer side 114 of the occluder frame segment 104, the tangent line 112 extending along the occluder frame segment 104 adjacent the neck portion 120 or intersection portion 122 of the occluder frame segment 104. With this arrangement, upon the occluder frame 100 being constricted within the sheath 22 (with anchor frame segments 60 pivotably coupled to the occluder frame segments 104 via the hinge component 64, similar to embodiments previously described and set forth herein), the occluder frame eyelet 106 may extend along or slightly beyond the tangent line to substantially prevent a point contact to, thereby, minimize resistance of the occluder frame 100 against the internal surface 102 of the sheath 22 or the occluder frame 100 against the tissue growth member 50. As depicted in FIG. 9, for simplicity purposes, the tissue growth member 50 is shown with minimized dashed lines and only two occluder frame segments 104 and their associated anchor frame segments 60 are depicted in their constrained form within the sheath 20. In this manner, because the structure defining the occluder frame eyelets 106 are formed on one side of the tangent line 112, the structure of the occluder frame segments 104 is minimized in its drag or pressure against the internal surface 102 of the sheath 22, thereby, minimizing resistance against the internal surface 102 of the sheath 22 as the pusher catheter 16 advances the medical device through the sheath 22, as set forth herein.

Figure 10:
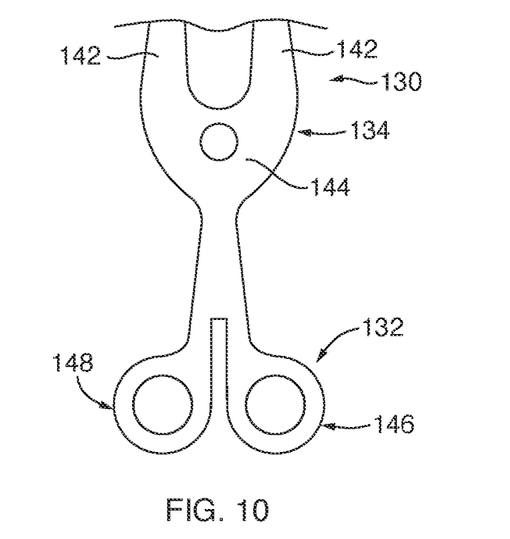
FIG. 10 is an enlarged front view of another embodiment of eyelet structure of the occluder portion, depicting the eyelet structure in a pre-formed state, according to another embodiment of the present invention.
Figure 11:
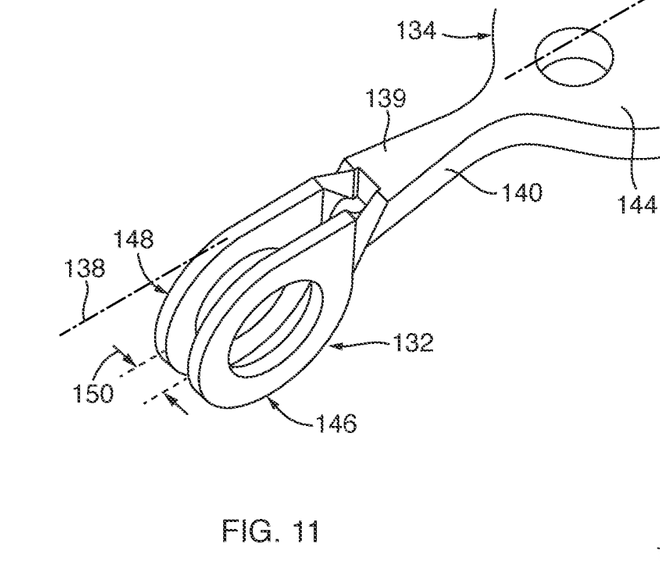
FIG. 11 is a perspective view of the eyelet structure, depicting the eyelet structure in a formed state, according to another embodiment of the present invention.
Figure 12:
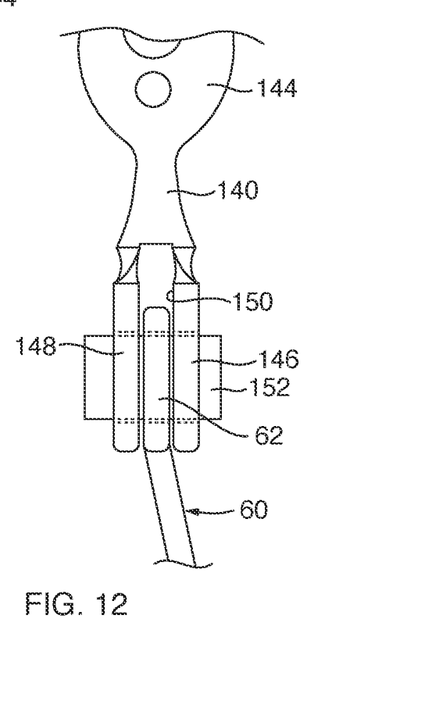
FIG. 12 is a perspective view of the eyelet structure coupled to an anchor frame eyelet with a hinge component, according to another embodiment of the present invention.

Now with reference to FIGS. 10-12, another embodiment of an occluder frame 130 that may include a pair of occluder frame eyelets 132 for a given occluder frame segment 134. Similar to previous embodiments, the occluder frame 130 may include multiple occluder frame segments 134 extending radially outward from a proximal end toward a distal end. Further, alternating ones of the occluder frame segments 134 of the occluder frame 130 may include the pair of occluder frame eyelets 132 adjacent the distal end of the occluder frame 130. In this embodiment, each of the pairs of the occluder frame eyelets 132 of the occluder frame 130 may be sized and configured to receive one of the anchor frame eyelets 62 between the pair of occluder frame eyelets 132. Further, similar to that depicted and described in the previous embodiment, each of the occluder frame eyelets 132 may be formed along one side of a tangent line 138 defined along an outer side 139 of the occluder frame segment 134 adjacent a neck portion 140 of the occluder frame segment 134.

Each of the occluder frame segments 134 having the occluder frame eyelets 132 may include a pair elongated portions 142 that may extend distally to an intersection portion 144. The intersection portion 144 may extend to the neck portion 140. The neck portion 140 may extend to the pair of occluder eyelets 132, such as a first occluder eyelet 146 and a second occluder eyelet 148. Such occluder frame 130 may be laser cut from Nitinol sheet material so that the first and second occluder frame eyelets 146, 148 extend in the same plane as the remaining portion of the occluder frame 130. Through one or more heat setting processes as known by one of ordinary skill in the art, the occluder frame 130 may be shaped so that the occluder frame 130 extends radially outward and distally from a proximal side toward a distal side of the occluder frame 130, similar to that depicted in FIG. 8. Further, in the one or more heat setting processes, the first and second occluder frame eyelets 146, 148 may be twisted, for example, in opposite rotational directions so that the flat structure of the first and second eyelets 146, 148 extend substantially perpendicular relative to the flat structure of the corresponding neck portion 140 of the occluder frame 130. As such, the first and second occluder frame eyelets 146, 148 may be heat set in a twisted position, that may be twisted about ninety degrees from its original laser cut position. With this arrangement, the first and second occluder frame eyelets 146, 148 may extend to define a gap 150 therebetween. The gap 150 may be sized and configured to receive a corresponding one of the anchor frame segments 60 that define the anchor frame eyelet 62. As such, the anchor frame segment 60 with its anchor frame eyelet 62 adjacent an end of the anchor frame segment 60 may be positioned and aligned with the first and second occluder frame eyelets 146, 148 so that the anchor frame segment 60 may be coupled to the occluder frame segment 134 with a hinge component 152. That is, the structure defining the anchor frame eyelet 62 may be positioned within the gap 150 between the first and second occluder frame eyelets 146, 148 so that the anchor frame eyelet 62 may be aligned with the first and second occluder frame eyelets 146, 148 so that the hinge component 152 may extend through each eyelet, as depicted in FIG. 12.

With the anchor frame segment 60 hingeably coupled within the gap 150 and between the opposing first and second occluder frame eyelets 146, 148, the anchor frame segment 60 may pivot about the hinge component 152. Further, since the anchor frame segment 60 may be sandwiched between structure defining the first and second occluder frame eyelets 146, 148, the anchor frame segment 60 may pivot with greater control by limiting lateral movement or sway of the anchor frame segment 60 relative to the occluder frame segment 134. In this manner, the anchor frame segments 60 may pivot about the hinge component 152 in a more controlled manner. This controlled pivoting facilitates minimized lateral movement since the anchor frame segments 60 are sandwiched between corresponding first and second occluder frame eyelets 146, 148, which may further minimize potential tangling of the anchor frame segments 60 upon the secondary hub 34 being moved through the primary hub 32 to move the anchor frame 44 between retracted and deployed positions, as previously described herein (See FIGS. 1, 1A, 2, and 2A). Furthermore, as previously set forth, each of the first and second occluder frame eyelets 146, 148 may extend along one side of the tangent line that may be defined along the neck portion 140 that corresponds with the first and second occluder frame eyelets 146, 148. As such, upon constricting the occluder frame 130 within the sheath 22, resistance of the occluder frame segments 134 against the internal surface of the sheath 22 may be minimized, similar to the described in the previous embodiment.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes incorporating any portion of one embodiment with another embodiment, all modifications, equivalents, and alternatives falling within the spirit and scope of the invention as defined by the following appended claims.

What is claimed is:

1. A medical device system for occluding a left atrial appendage of a heart, comprising:
   a pusher catheter extending between a distal end and a proximal end, the proximal end being associated with a handle;
   a medical device configured to be coupled adjacent the distal end of the pusher catheter, the medical device having a primary hub and a secondary hub such that a framework extends between the primary hub and the secondary hub, the primary hub defining a bore and an axis each extending through the primary hub, the primary hub including grooves defined in the primary hub so as to extend adjacent the bore and in a distal most side of the primary hub, the framework configured to be moveable between a constricted position and an expanded position such that as the framework is moved between the constricted and expanded positions the secondary hub moves along the axis and through the bore of the primary hub, the grooves sized and configured to align multiple portions of the framework so that the multiple portions of the framework alignably move through the grooves as the secondary hub moves through the bore of the primary hub.

2. The medical device system of claim 1, wherein the multiple portions of the framework each extend with a wire-like structure.

3. The medical device system of claim 1, wherein the grooves are positioned along the distal most side of the primary hub so as to be radially spaced and radially positioned relative to the axis of the primary hub.

4. The medical device system of claim 1, wherein the multiple portions of the framework are configured to slidingly move through the grooves.

5. The medical device system of claim 1, wherein the grooves are defined within an internal side of a ring structure, the ring structure coupled to a distal side of the primary hub such that the grooves are positioned to surround the axis defined in the primary hub.

6. The medical device system of claim 1, wherein the framework extends to define an occluder portion and an anchor portion, the anchor portion pivotably coupled to the occluder portion such that the anchor portion pivots as the secondary hub moves along the axis.

7. The medical device system of claim 1, wherein the framework includes a tissue growth member positioned adjacent a proximal side of the framework.

8. A medical device for occluding a left atrial appendage of a heart, comprising:
   a framework extending between a primary hub and a secondary hub, the primary hub defining a bore and an axis each extending through the primary hub, the primary hub including grooves defined in the primary hub so as to extend adjacent the bore and in a distal most side of the primary hub, the framework configured to be moveable between a constricted position and an expanded position such that as the framework is moved between the constricted and expanded positions the secondary hub moves along the axis and through the bore of the primary hub, the grooves sized and configured to align multiple portions of the framework so that the multiple portions of the framework alignably move through the grooves as the secondary hub moves through the bore of the primary hub.

9. The medical device of claim 8, wherein the multiple portions of the framework each extend with a wire-like structure.

10. The medical device of claim 8, wherein the grooves are positioned along the distal most side of the primary hub so as to be radially spaced and radially positioned relative to the axis of the primary hub.

11. The medical device of claim 8, wherein the multiple portions of the framework are configured to slidingly move through the grooves.

12. The medical device of claim 8, wherein the grooves are defined within an internal side of a ring structure, the ring structure coupled to a distal side of the primary hub such that the grooves are positioned to surround the axis defined in the primary hub.

13. The medical device of claim 8, wherein the framework extends to define an occluder portion and an anchor portion, the anchor portion being pivotably coupled to the occluder portion such that the anchor portion pivots as the secondary hub moves along the axis.

14. The medical device of claim 8, wherein the framework includes a tissue growth member positioned adjacent a proximal side of the framework.

15. A medical device system, comprising:
   a sheath extending longitudinally to define a lumen and an axis along a length of the sheath;
   a pusher catheter extending longitudinally between a proximal end and a distal end, the proximal end being associated with a handle, the pusher catheter sized and configured to be moved through the lumen of the sheath; and
   a medical device configured to be coupled adjacent the distal end of the pusher catheter, the medical device including a framework moveable between a constricted position and a deployed position, the framework extending to define an elongate structure with an eyelet positioned adjacent to one end of the elongate structure, the elongate structure defining a line extending tangentially along the elongate structure adjacent the one end, the eyelet extending from the elongate structure such that the eyelet extends along a single side of the tangentially extending line;

wherein, upon the medical device being in the constricted position, the eyelet positioned along the single side of the tangentially extending line minimizes resistance of the medical device against an internal surface of the sheath;

wherein the framework extends to define an occluder frame and an anchor frame, the occluder frame hingeably coupled to the anchor frame with a hinge component positioned in the eyelet structure;

wherein the anchor frame comprises an anchor frame eyelet, the hinge component positioned through both the anchor frame eyelet and the eyelet structure; and wherein the eyelet structure comprises a first eyelet and a second eyelet with a gap therebetween, the anchor frame eyelet positioned in the gap so that the hinge component extends through each of the first and second eyelets and the anchor frame eyelet.

16. A medical device system configured to minimize resistance relative to an internal surface of a sheath, the medical device system comprising:

a pusher catheter extending longitudinally between a proximal end and a distal end, the proximal end being associated with a handle, the pusher catheter sized and configured to be moved through the lumen of the sheath; and a medical device configured to be coupled adjacent the distal end of the pusher catheter, the medical device including a framework moveable between a constricted position and a deployed position, the framework extending to define an elongate structure with an eyelet structure positioned adjacent to one end of the elongate structure, the elongate structure defining a line extending tangentially along the elongate structure adjacent the one end, the eyelet structure extending from the elongate structure such that the eyelet structure extends along a single side of the tangentially extending line;

wherein, upon the medical device being in the constricted position, the eyelet is positioned along the single side of the tangentially extending line to minimize resistance of the medical device against the internal surface of the sheath;

wherein the framework extends to define an occluder frame and an anchor frame, the occluder frame hingeably coupled to the anchor frame with a hinge component positioned in the eyelet structure;

wherein the anchor frame comprises an anchor frame eyelet, the hinge component positioned through both the anchor frame eyelet and the eyelet structure; and wherein the eyelet structure comprises a first eyelet and a second eyelet with a gap therebetween, the anchor frame eyelet positioned in the gap so that the hinge component extends through each of the first and second eyelets and the anchor frame eyelet.

\* \* \* \* \*